Patented July 27, 1943

2,325,367

UNITED STATES PATENT OFFICE 2,325,367

METHOD OF TREATING FISH LIVERS TO REMOVE THE OIL THEREFROM

Loran Oid Buxton, Belleville, and Sol T. Lipsius, East Orange, N. J., assignors to National Oil Products Company, Harrison, N. J., a corporation of New Jersey No Drawing. Application June 13, 1941, Serial No. 397,912

20 Claims. (Cl. 260—412.1)

This invention relates in general to the treatment of fish livers and in particular to the treatment of fish livers to remove the vitamins and vitaminiferous oils therefrom.

As is well known, many fish liver oils have a high concentration of the valuable vitamins A and D. Numerous processes have been proposed for rendering these fat-soluble vitamin-containing oils from their natural source. The general practice at present is to steam cook the fish livers at temperatures of about 100° C. or above to separate the oil therefrom. Disadvantages of such processes are that a considerable portion of the vitamin A content is destroyed by oxidation as a result of the high temperatures employed and exposure of the vitamin-containing oil to the air during the cooking process. Also fish liver oils recovered by such processes invariably contain certain hydroxylated and nitrogenous compounds which impart objectionable dark colors, fishy odors and tastes to said oils. Another disadvantage of such processes is that the conditions employed are very favorable to the action of certain lipolytic enzymes present in large amounts in the livers which tend to split the oil and produce large quantities of free fatty acids, thus complicating the refining of the recovered oil. A further disadvantage is that cooking at high temperatures tends to darken and discolor the oil by acting on the protein materials to render them oil-soluble, which also complicates the refining process. Various methods have been proposed to overcome the above named disadvantages, but such methods have not been entirely satisfactory.

A proposal has been made to cook the livers at a reduced temperature and in the absence of oxygen; although this method does tend to prevent the oxidation of vitamin A, it does not substantially overcome the other disadvantages mentioned above.

Another method proposed features what might be termed a cold extraction process, whereby the ground livers are mixed, at a temperature at which the oil contained in the livers will flow freely, with a dehydrated pulp of vegetable origin, which pulp is oil repellant but water absorbent. The dehydrated pulp has the effect of breaking open the oil containing hepatic cells and at the same time absorbing the water released from the ruptured cells as well as the surface water present. The oil which is thus released from the hepatic cells is allowed to run off, and the oil remaining in the mass is then mechanically extracted.

Although this method will work to some extent with livers containing a high percentage of oil, it is not commercially practicable for the production of oil from livers containing relatively low percentages of oil. With such livers the oil will not flow from the mixture of liver and pulp, and in many cases only small quantities of the oil can be removed even by mechanical extraction. Even with livers of high oil content, a substantial percentage of the vitamins contained in the livers is not removed but remains in the liver mass, as it has been found that a part of the vitamin content of the liver is not intimately associated with the oil but instead seems to be contained in the protein material of the liver oil.

The general object of this invention is to obviate the foregoing and other disadvantages.

A specific object of this invention is to provide an improved process for the treatment of fish livers and other marine products to remove the vitamins and vitamin-bearing oils therefrom.

Another object of this invention is to remove substantially all the fat-soluble vitamin content from fish livers.

A further object of this invention is to produce a vitamin-bearing oil substantially free of nauseous fishy odors and tastes.

Other objects of this invention will in part be obvious and will in part appear hereinafter.

It has now been discovered that the foregoing and other objects of this invention may be realized by treating fish livers or other marine products according to the process of the invention, which comprises mixing the ground, chopped, macerated or otherwise disintegrated livers or other marine products with an oil adsorbent vegetable material, digesting the mass by means of heat at a temperature below 100° C. and in the relative absence of oxygen, and then separating the oil therefrom by either mechanical or solvent extraction. The livers may be drained or washed before disintegrating if desired. The process is preferably carried out by adding an alkali such as caustic alkali to the mass so that the digesting operation will be carried out in an alkaline media, and then separating the oil from the digested mass by extraction with a suitable solvent. Suitable solvents include, among others, ethylene dichloride, trichlorethylene, heptane, dichloroethylether, ethyl ether, chloroform, petroleum ether, cyclohexane, etc., the first three solvents mentioned being highly preferred.

The invention accordingly comprises the several steps and the relation of one or more of such steps with respect to each of the others thereof, which will be exemplified in the process hereinafter disclosed, and the scope of the invention will be indicated in the claims.

In carrying out the process of this invention, any marine or animal liver containing a fat-soluble vitamin may be used, such as the livers obtained from cod, halibut, mackerel, swordfish, pollack, tuna, shark, ling cod, jew fish, whale, spearfish, etc. This invention may also be practiced for the removal of body oils from such fish as sardine, herring, menhaden, etc. The digestion process is carried out in any suitable apparatus therefor. While the digestion operation may be carried out in the absence of alkali, it is preferred to add an alkali such as caustic alkali to the mass as an alkaline media tends to inhibit the action of the lipolytic enzymes present in the livers and thus minimizes the formation of free fatty acids. The alkaline media also tends to inhibit the action of the proteolytic enzymes which act upon the protein material to produce a dark, discolored proteinaceous materials with an objectionable odor and taste. These proteinaceous materials are somewhat soluble in oil, especially in the presence of large amounts of free fatty acids; the removal of these proteinaceous materials and the free fatty acids has always complicated the refining processes.

The vegetable material used in accordance with this invention may be any oil adsorbent material, such as e. g., cottonseed meal, corn germ meal, oat meal, rice bran, sesame meal, wheat germ meal, wheat bran, soya bean meal and the like. Such vegetable adsorbent materials tend to draw the oil out of the liver mass and also help to prevent the dark and discolored proteinaceous materials that may be formed in the digestion process from dissolving in the oil. The reason for this is that by adding such vegetable materials, a mass composed of more or less granular particles is obtained instead of a relatively fluid mixture. In such a granular mass the objectionable proteinaceous materials do not tend to dissolve in the oil as they do when suspended in the oil alone or in a relatively fluid mixture. Furthermore, when the liver-meal mass is extracted with the solvent, the granular structure brings the solvent in more intimate contact with the meal and liver particles, and more efficient results are obtained than by extracting the cooked livers with the solvent alone.

The amount of meal used may vary according to whether or not alkali is added to the mixture. When alkali is present, it is preferred to use from 5 to 20 parts of meal per 100 parts of liver. If alkali is not added, it is preferred to use from one to two parts of meal per one part of liver, or enough meal to obtain a substantially dry mass. Although it is preferred to use a rather finely ground meal as more efficient results are obtained, if it is desired, a crushed, chopped or coarsely ground material may be used. In most cases it is preferred to use a meal containing a relatively small percentage of naturally occurring oil.

Among the alkalis which may be used in the preferred process are sodium hydroxide, sodium carbonate, potassium hydroxide, potassium carbonate, ammonium hydroxide, calcium hydroxide, calcium oxide, or any other alkaline reagent suitable for such purposes. It is preferred, however, to use one of the first three alkalis mentioned above. The expression "alkali" is used herein to connote any of the above and similar alkaline reagents.

In carrying out the preferred embodiment of this invention the liver and meal are intimately mixed together and an amount of alkali not to exceed 5% (dry weight) based on the weight of the livers is added thereto; the whole mass is then heated for approximately one hour at a temperature of about 70° C. and in the relative absence of oxygen. After cooling, the oil liberated from the livers may be allowed to run off and any oil remaining may then be removed by mechanical extraction. In most cases, however, it is preferred to extract the digested mass with a suitable solvent, such as ethylene dichloride or any of the other solvents hereinbefore mentioned. A somewhat higher vitamin yield is thereby obtained as any vitamins not intimately associated with the oil are thus also removed from the liver. With livers containing relatively small amounts of oil, it is almost absolutely necessary to extract with a solvent or a foreign oil as the oil will not drain from the liver-meal mixture and only a very small percentage of the oil can be obtained by mechanical extraction.

If preferred, the livers may be mixed with a suitable meal and heated as mentioned above, but in the absence of alkali; the mixture may then be heated for a certain length of time with some solvent for vitaminiferous materials, such as ethylene dichloride, or one of the other solvents mentioned above, or a mixture thereof in order to remove the oil. When the livers are heat-treated in the absence of alkali, it is preferred to use an amount of meal equal to or greater than the weight of the livers.

Oils obtained by the process of this invention have the desirable features of being relatively free of obnoxious fishy odors and tastes, relatively low in free fatty acid content, clear and not dark or discolored, and of a higher potency in vitamins A and D than oils prepared from similar materials by previously known processes.

Another advantage of the oils rendered by the process of this invention is that they are more resistant to oxidation than oils produced heretofore by known processes, as they contain less impurities, such as free fatty acids and nitrogenous materials, which tend to affect the keeping qualities and stability of the oils; and it appears that the natural antioxidants in the liver-meal are also extracted along with the oil and further tend to enhance the stability of oils so produced.

Before removing the solvent from the oil extracted from the liver mass, it may be desired to treat the solvent-oil mixture by the process described in the copending application of Buxton, Serial No. 227,599, filed August 30, 1938, which matured into U. S. Patent No. 2,306,776 on December 29, 1942. This process relates to the treatment of a fat-soluble vitamin-containing material with a deaerated carbon in the presence of a solvent to remove undesirable colors, tastes and odors. The solvent-oil mixture obtained in the process of this invention may also be treated by the process described in the copending application of Buxton and Simons, Serial No. 227,600, filed August 30, 1938, which matured into U. S. Patent No. 2,255,875 on September 16, 1941.

For a fuller understanding of the nature and objects of the invention, reference should be had to the following examples which are given merely to further illustrate the invention and are not to be construed in a limiting sense, all parts being given by weight.

*Example I*

2 parts of blue whale livers were ground to a fine pulp and mixed thoroughly with 3 parts of pressed cottonseed meal and heated for a time at about 80° C. A portion of the relatively dry mass was extracted for one hour with 2 volumes of ethylene dichloride. After filtering and removing the solvent, a light-colored oil resulted. This oil when compared in color, taste, odor and vitamin A potency with a sample of oil extracted from the same type of livers by other processes was much improved in all respects.

*Example II*

200 parts of finely ground bluefin tuna liver were intimately mixed with 50 parts of wheat germ flour and 4 parts of 45% aqueous KOH added. The mixture was then stirred for about one hour while heating at about 80° C. Care was taken to exclude air from the reaction mixture during the heating step. The mass was cooled to room temperature and then extracted three times with ethylene dichloride. The combined extracts were filtered, dried and the solvent removed under reduced pressure. The resulting oil was superior in color, odor and taste and vitamin A potency to oils produced from the same type of livers by other processes.

*Example III*

200 parts of finely ground tuna livers were mixed with 10 parts of oatmeal flour and 10 parts of 45% aqueous NaOH and heat-treated and extracted as in Example II. The combined solvent extracts which contained the oil extracted from the digested liver mass were then adjusted to a 10% solution and treated further by the refining process described in the copending application of Buxton, Serial No. 227,599, filed August 30, 1938. The resulting oil after removing the solvent was light-golden yellow in color, and substantially devoid of obnoxious odors and tastes, and free fatty acids.

*Example IV*

200 parts of finely ground tuna livers were intimately mixed with 20 parts of wheat germ meal and 20 parts of 30% aqueous $Na_2CO_3$. The mixture was then treated further as in Example II. The resulting oil was light-golden yellow in color, substantially devoid of nitrogenous materials, and contained less than 0.5% free fatty acids.

The process of the invention makes possible the production of fish liver oils and similar products far superior in every respect to oils produced by prior known extraction methods. The products produced by the novel process are characterized by being greatly improved as to color, odor, taste and vitamin potency.

The length of the digesting operation may vary depending upon the type and condition of the livers, the main purpose of the digesting operation being to decompose the livers sufficiently so that the oil is released therefrom and may then be adsorbed by the meal. Therefore the operation need be continued no longer than necessary to accomplish this purpose. The digestion operation may be carried out at a temperature within the range from 60° to 130° C., but it is preferred to carry it out at a temperature around 80° C.

The expression "comminuted livers" is employed herein to connote livers that have been ground, chopped, macerated or the like. Although the whales are not considered to be fish, but are strictly classified as mammals, the expression "fish livers" is employed herein to connote both livers of fish and of whales and other aquatic mammals.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent, is:

1. In a process for recovering fat-soluble vitamins from marine products, the steps comprising admixing a comminuted marine product selected from the group consisting of fish and fish livers with an oil adsorbent vegetable material, adding thereto an amount of an alkaline medium not to exceed 5% (dry weight) based on the weight of the comminuted marine product, digesting the mass by means of heat and removing the oil from the digested mass.

2. In a process for treating fish livers to obtain the vitamins and vitamin-bearing oils contained therein, the steps comprising admixing comminuted fish livers with an oil adsorbent vegetable material, adding thereto an amount of an alkaline medium not to exceed 5% by dry weight of the weight of the livers, digesting the mass by means of heat, and then removing the oil from the digested mass.

3. In a process for treating fish livers to remove the vitamins and vitamin-bearing oils contained therein, the steps comprising admixing comminuted fish livers with an oil adsorbent vegetable material, adding thereto an amount of an alkaline medium not to exceed 5% (dry weight) based on the weight of the comminuted fish livers, digesting the mass by means of heat, and then extracting the vitamins and vitamin-bearing oils contained therein by refluxing the whole mass with a suitable solvent for vitaminiferous materials.

4. In a process for treating fish livers to obtain the vitamins and vitamin-bearing oils contained therein, the steps comprising admixing comminuted fish livers with an oil adsorbent vegetable material, adding thereto an amount of an alkali not to exceed 5% (dry weight) based on the weight of the livers, digesting the mass by means of heat, allowing the first appearing oil to run off, and removing the remaining oil by mechanical extraction.

5. In a process for treating fish livers to obtain the vitamins and vitamin-bearing oils contained therein, the steps comprising admixing comminuted fish livers with an oil adsorbent vegetable material, adding thereto an amount of an alkali not to exceed 5% (dry weight) based on the weight of the livers, digesting the mass by means of heat, and then removing the vitamins and vitamin-bearing oils contained therein by extracting with a suitable solvent for vitaminiferous materials.

6. The process in accordance with claim 3, wherein the solvent used is ethylene dichloride.

7. The process in accordance with claim 5, wherein the solvent used is ethylene dichloride.

8. The process in accordance with claim 5, wherein the solvent used is heptane.

9. The process in accordance with claim 5, wherein the vegetable material used is wheat germ meal.

10. The process in accordance with claim 5, wherein the vegetable material used is cottonseed meal.

11. The process in accordance with claim 5, wherein the vegetable material used is soybean meal.

12. A process for removing the vitamins and vitamin-bearing oils from tuna fish livers, which comprises admixing comminuted tuna fish livers with an oil adsorbent vegetable material, adding thereto an amount of an alkali not to exceed 5% (dry weight) based on the weight of the livers, digesting the mass by means of heat, and then removing the vitamins and vitamin-bearing oils contained therein by extracting the whole mass with a suitable solvent for vitaminiferous materials.

13. The process of claim 12 in which the solvent is ethylene dichloride.

14. A process for removing the vitamins and vitamin-bearing oils from mackerel livers, which comprises admixing comminuted mackerel livers with an oil adsorbent vegetable material, adding thereto an amount of an alkali not to exceed 5% (dry weight) based on the weight of the livers, digesting the mass by means of heat, and then removing the vitamins and vitamin-bearing oils contained therein by extracting the whole mass with a suitable solvent for vitaminiferous materials.

15. A process for removing the vitamins and vitamin-bearing oils from fish livers, which comprises admixing comminuted fish livers with cottonseed meal, adding thereto an amount of an alkali not to exceed 5% (dry weight) based on the weight of the livers, digesting the mass by means of heat, and then removing the vitamins and vitamin-bearing oils contained therein by extracting the whole mass with ethylene dichloride.

16. A process for removing the vitamins and vitamin-bearing oils from fish livers, which comprises admixing comminuted fish livers with cottonseed meal, adding thereto an amount of an alkali not to exceed 5% (dry weight) based on the weight of the livers, digesting the mass by means of heat, and then removing the vitamins and vitamin-bearing oils contained therein by extracting the whole mass with trichlorethylene.

17. A process for removing the vitamins and vitamin-bearing oils from fish livers, which comprises admixing comminuted fish livers with soybean meal, adding thereto an amount of an alkali not to exceed 5% (dry weight) based on the weight of the livers, digesting the mass by means of heat, and then removing the vitamins and vitamin-bearing oils contained therein by extracting the whole mass with ethylene dichloride.

18. A process for removing the vitamins and vitamin-bearing oils from fish livers, which comprises admixing comminuted fish livers with soybean meal, adding thereto an amount of an alkali not to exceed 5% (dry weight) based on the weight of the livers, digesting the mass by means of heat, and then removing the vitamins and vitamin-bearing oils contained therein by extracting the whole mass with trichloroethylene.

19. A process for removing the vitamins and vitamin-bearing oils from fish livers, which comprises admixing comminuted fish livers with wheat germ meal, adding thereto an amount of an alkali not to exceed 5% (dry weight) based on the weight of the livers, digesting the mass by means of heat, and then removing the vitamins and vitamin-bearing oils contained therein by extracting the whole mass with ethylene dichloride.

20. A process for removing the vitamins and vitamin-bearing oils from fish livers, which comprises admixing comminuted fish livers with wheat germ meal, adding thereto an amount of an alkali not to exceed 5% (dry weight) based on the weight of the livers, digesting the mass by means of heat, and then removing the vitamins and vitamin-bearing oils contained therein by extracting the whole mass with trichloroethylene.

LORAN OID BUXTON.
SOL T. LIPSIUS.